United States Patent [19]

Doshi

[11] Patent Number: 4,792,580

[45] Date of Patent: Dec. 20, 1988

[54] HIGH SOLID COATINGS CONTAINING TITANATES AND SILANES

[75] Inventor: Jyotindra K. Doshi, Alsip, Ill.

[73] Assignee: The Sherwin-Williams Company, Cleveland, Ohio

[21] Appl. No.: 141,368

[22] Filed: Jan. 5, 1988

Related U.S. Application Data

[62] Division of Ser. No. 772,965, Sep. 4, 1985.

[51] Int. Cl.$^4$ ................................................. C08K 5/24
[52] U.S. Cl. .................................... 524/261; 524/398; 523/511
[58] Field of Search ................ 524/261, 398; 523/511, 523/456

[56] References Cited

U.S. PATENT DOCUMENTS

| | | | |
|---|---|---|---|
| 3,460,975 | 8/1969 | Stebleton | 117/94 |
| 3,674,724 | 7/1972 | Marzocchi | 260/3 |
| 3,687,882 | 8/1972 | Bishop | 260/29.2 M |
| 3,830,777 | 8/1974 | Burton | 260/37 N |
| 3,832,203 | 8/1974 | Saunders et al. | 106/287 SB |
| 4,042,749 | 8/1977 | Sandvig | 428/412 |
| 4,069,192 | 1/1978 | Monte et al. | 260/37 |
| 4,084,021 | 4/1978 | Sandvig | 427/44 |
| 4,105,465 | 8/1978 | Berger | 106/308 |
| 4,122,062 | 10/1978 | Monte et al. | 260/42.14 |
| 4,141,751 | 2/1979 | Moreland | 106/308 Q |
| 4,145,369 | 3/1979 | Hira et al. | 260/831 |
| 4,151,154 | 4/1979 | Berger | 260/40 R |
| 4,200,664 | 4/1980 | Young et al. | 427/4 |
| 4,221,697 | 9/1980 | Osborn et al. | 260/42.53 |
| 4,286,999 | 9/1981 | Zucker | 106/308 Q |
| 4,291,136 | 9/1981 | Keogh | 525/102 |
| 4,374,898 | 2/1983 | Mahr | 428/447 |
| 4,388,437 | 6/1983 | Ona | 524/588 |
| 4,409,342 | 10/1983 | Ancker et al. | 523/215 |
| 4,414,340 | 11/1983 | Senatore et al. | 523/219 |
| 4,448,848 | 5/1984 | Okita et al. | 428/447 |
| 4,450,221 | 5/1984 | Terada et al. | 430/106.6 |
| 4,487,883 | 12/1984 | Homan | 524/792 |
| 4,489,029 | 12/1984 | Keogh et al. | 264/174 |
| 4,490,282 | 12/1984 | Corboy et al. | 252/503 |
| 4,490,436 | 12/1984 | Kawakami et al. | 428/403 |
| 4,504,617 | 3/1985 | Yui et al. | 524/426 |
| 4,526,930 | 7/1985 | Keogh | 525/326.5 |
| 4,579,913 | 4/1986 | Keough | 525/326.5 |

FOREIGN PATENT DOCUMENTS 1112181  11/1981  Canada .................... 167/308

OTHER PUBLICATIONS

Chemical Abstracts 94:193205t.
Chemical Abstracts 90:123182b.
Dow Corning; *Silane Coupling Agents.*
Kenrich Petrochemicals, Inc.; Ken-React (*Titanate Coupling Agents for Filled Polymers*).
National Sampe Technical Conference 1978, 10 (Materials Synergisms) 835–844, *White Ink for Video Jet Printing*, by H. N. Vazirani.

*Primary Examiner*—Joseph L. Schofer
*Assistant Examiner*—N. Sarofim
*Attorney, Agent, or Firm*—Robert E. McDonald; Steven W. Tan

[57] ABSTRACT

Pigmented high solid coating compositions are produced with reduced viscosities by the addition of at least one silane and at least one titanate.

11 Claims, No Drawings

HIGH SOLID COATINGS CONTAINING TITANATES AND SILANES

This is a divisional of co-pending application Ser. No. 772,965 filed on Sept. 4, 1985.

BACKGROUND OF THE INVENTION

1. Field of the Invention

This invention relates to pigmented high solid coatings containing viscosity reducing amounts of a hydrolyzable silane and a titanate ester.

2. Description of the Prior Art

Pigmented high solid coatings are known in the art. One approach towards producing high solid coatings has been the use of lower molecular weight resins, e.g. those having a weight average molecular weight less than about 10,000. Since the lower molecular weight resins have a lower initial viscosity than higher molecular weight materials, less solvent is required to reduce the coatings to usable viscosities. Other approaches known in the art include the use of reactive diluents such as low molecular weight alcohols or unsaturated materials which reduce the viscosity of the coatings but cure or dry along with the resin to minimize the amount of volatile materials given off.

Due to the strict air pollution regulations, and the cost involved in utilizing a solvent in a coating which is merely lost to the atmosphere upon the drying or curing of the coating, providing high solid coatings at the highest possible solids and lowest possible viscosities is vitally important.

It is often desirable to incorporate high levels of pigmentation into high solid coatings. First, the pigments, especially extender pigments, are typically much less expensive than the vehicle itself. Additionally, higher pigment levels provide better hiding and the ability to formulate the coatings to produce almost any desired gloss. Frequently, since the pigments often have better resistance to ultraviolet radiation than the film-forming vehicles, the addition of high levels of pigment can provide better durability and resistance to weathering than coatings having lower PVCs. The use of the higher PVC levels, however, results in increased viscosity due to the presence of the high levels of pigments. It would therefore be an advantage to provide reduced viscosities in these high solid, high PVC paints or to provide higher solids coatings at the same viscosities.

This invention involves the surprising discovery that a combination of a hydrolyzable silane and a titanate ester is very effective in reducing the viscosity of highly pigmented high solid coatings.

The use of organotitanates and organosilanes for treating inorganic particles or ceramic fibers has been known in the prior art. However, the synergistic combination of a silane and a titanate in high PVC, high solid coatings formulations has not been taught.

SUMMARY OF THE INVENTION

This invention involves high solid coatings having reduced viscosity and a process for preparing those coatings by incorporating a combination of at least one titanate ester and at least one hydrolyzable silane into the coating. The high solid coatings of this invention can be conveniently applied by conventional spray application even though they contain less than 50% by weight solvent. The coatings of this invention have pigment volume concentrations (PVC) of at least 20% and even as high as about 65%. Pigment volume concentration is well known in the art to mean the percentage of volume of total pigment to the volume of total non-volatile matter in a coating.

The pigmented high solid coating compositions of this invention comprise, in percent by weight, 10-50% of an inert, volatile solvent component, and 50-90% of a non-volatile component and have a pigment volume concentration of at least 20%. The non-volatile component consists essentially of:

(a) an organic film-forming vehicle having active hydrogen or epoxy functionality;
(b) a crosslinker for the film-forming vehicle;
(c) at least one extender pigment;
(d) an effective viscosity reducing amount of at least one hydrolyzable silane; and
(e) an effective viscosity reducing amount of at least one titanate ester.

In a preferred version of this invention the high solids coating composition also contains at least one opacifying pigment, especially titanium dioxide.

This invention also relates to a process for reducing the viscosity of a pigmented high solid coating composition by incorporating into the composition an effective viscosity reducing amount of at least one hydrolyzable silane and at least one titanate ester.

It is therefore an object of this invention to provide novel high solid coatings. It is another object of this invention to provide a process for reducing the viscosity of pigmented high solid coatings by the addition of a hydrolyzable silane and a titanate ester. An additional object of this invention is to provide high solid, high PVC coatings of at least 50% solids by weight which are readily applicable by conventional application methods. A further object of this invention is to provide high solid coatings which can incorporate increased levels of pigmentation without significantly increasing the viscosity of the coating due to the presence of silane and titanate coupling agents. These and other objects of the invention will be apparent from the following description.

DETAILED DESCRIPTION OF THE INVENTION

Organic film-forming vehicles which are useful in high solid coatings and which have active hydrogen or epoxy functionality are well known in the art and are typically used for many industrial coating applications. Active hydrogen functionality means those reactive groups as determined by the Zerewitinoff Method as described by Kohler in *J. Am. Chem. Soc.*, 49, 3181 (1927). Repsentative reactive groups include —OH, —COOH, —SH, —NH, etc. The organic film-forming vehicles typically will have weight average molecular weights between about 200 and about 10,000. Typically the molecular weight will be between about 500 and about 6,000.

The film-forming vehicles can be prepared by a number of methods well known in the art. Hydroxy or acid functional alkyd or polyester vehicles are well known in the art and can be prepared in a known matter by the condensation of polyhydric alcohols and polycarboxylic acids or anhydrides, with or without the inclusion of natural drying oil fatty acids. By adjusting the stoichiometry of the alcohols and the acids, polymers can be readily produced having an excess of either acid or alcohol functionality. A representative high solid polyester vehicle is taught in U.S. Pat. No. 4,169,825.

Polyepoxide polymers are also well known in the art. The polyepoxides may be saturated or unsaturated, aliphatic, cycloaliphatic, aromatic or heterocyclic. Examples of suitable polyepoxides include the generally known polyglycidyl ethers of polyphenols such as those prepared by the etherification of a polyphenol with epichlorohydrin or dichlorohydrin in the presence of an alkali. Additionally, polyepoxides can be prepared as acrylic resins by the polymerization of unsaturated monomers having epoxy functionality.

Acrylic resins containing amine functionality, hydroxyl functionality, epoxy functionality, etc. can also be prepared by methods well known in the art. The acrylic polymers are typically prepared by the addition polymerization of one or more monomers. Typically the monomers include one or more alkyl esters of acrylic acid or methacrylic acid optionally together with one or more ethylenically unsaturated monomers. Suitable acrylic esters include methyl methacrylate, ethyl methacrylate, propyl methacrylate, butylacrylate, vinylacetate, etc. Monomers having active hydrogen or epoxy functionality which can be incorporated into the acrylic polymers include acrylic acid, methacrylic acid, 2-hydroxyethyl acrylate, 4-hydroxybutyl methacrylate, t-butyl amino ethyl methacrylate, glycidyl methacrylate, etc. A representative high solid acrylic vehicle is taught in U.S. Pat. No. 4,276,212.

Typically, the acrylics are prepared by conventional free radical addition polymerization techniques. If desired, the polymerization can be catalyzed by conventional catalysts known in the art such as azo, peroxy, or redocks catalysts. The molecular weight of the polymer can be controlled by the monomer selection, reaction temperature and time, and/or the use of chain transfer agents as is well known in the art. Typically, the acrylic monomers are heated at temperatures ranging from about 120° F. to about 400° F. and especially 180° F. to 300° F. to effect the polymerization.

Polyamines can be prepared by methods also well known in the art such as by the free radical addition polymerization of acrylic or other unsaturated monomers containing primary or secondary amine functionality, or by the reaction of amines having at least two amine groups per molecule with a polycarboxylic acid to form polyamide amines, or by the reaction of primary amines with epoxy materials to produce secondary amine and hydroxyl functionality.

The coatings of this invention also incorporate a crosslinking agent for reaction with the active hydrogen or epoxy functionality as is known in the art. Polyisocyanates, which optionally may be blocked, are useful crosslinking agents for active hydrogen functionality containing vehicles. Polyepoxides having at least two epoxy groups are useful in crosslinking reactions with vehicles having amine or carboxylic acid functionality. Aminoplast resins are useful crosslinkers for reaction with hydroxyl functionality. Epoxy functional vehicles can be crosslinked by reaction with polyamine, anhydrides or polycarboxylic acid crosslinkers.

The isocyanate functional crosslinkers are well known in the art. The isocyanate crosslinkers contain two or more isocyanate groups per molecule, and if desired can be blocked by reaction with phenol, t-butanol, caprolactam, diethyl malonate, etc. Representative polyisocyanates include the aliphatic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 3-isocyanotomethyl-3,5,5-trimethylcyclohyexylioscyanate, and the 1,3-cyclopentane, 1,4-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chloro-diphenylene diisocyanate; the triisocyanates such as triphenyl methane-4,4',4'-triisocyanate, 1,3,5-triisocyanate benzene and 2,4,6-triisocyanate toluene; and the tetraisocyanates such as 4,4'-diphenyl-dimethyl methane-2,2'- 5,5'-tetraisocyanate; the polymerized polyisocyanates such as tolylene diisocyanate dimers and trimers, and other various polyisocyanates containing biuret, urethane, and/or allophanate linkages.

Aminoplast resins are condensates of a aldehyde such as formaldehyde, acetaldehyde benzaldehyde or mixtures thereof with a nitrogenous compound such as urea, melamine, or benzoguanamine or a lower alkyl ether of such a condensate. The lower alkyl ethers are conveniently prepared by the reaction of alcohols such as methanol, ethanol, benzylalcohol, etc. with the reaction product of the aldehyde and the nitrogenous compound.

The coatings of this invention will contain about 10 to 50% by weight of an inert solvent which is not reactive with the vehicle or the crosslinker under conditions of storage or cure. Typical solvents include toluene, xylene, butyl acetate, methyl ethyl ketone, ethoxyethanol, etc.

The high solid coatings of this invention will also include at least one extender pigment. The term extender pigment means achromatic pigments that do not contribute significantly to the hiding power of the paint. Representative preferred extender pigments include calcium carbonate, clays (aluminum silicates). talc (magnesium silicate), silicas, calcium silicate, micas (potassium aluminum silicate), barytes, gypsum (calcium sulfate), etc.

Essentially any opacifying pigment known in the art can be used in the practice of this invention. Representative opacifying pigments include white pigments such as titanium dioxide, zinc oxide, antimony oxide, etc. and organic or inorganic chromatic pigments such as iron oxide, carbon black, zinc chromate, phthalocyanine blue, etc.

It is preferred in the practice of this invention that both an opacifying pigment, especially $TiO_2$, and at least one extender pigment will be present. When both opacifying pigments and extender pigments are present, they can be included in the formulation at any weight percent relative to each other.

The coatings may also contain other additives such as flow agents, catalysts, diluents, which may be reactive, ultraviolet light absorbers, etc. The coatings may typically be applied to any substrate such as metal, plastic, wood, glass, synthetic fibers, etc. by brushing, dipping, roll coating, flow coating, spraying or other method conventionally employed in the coating industry.

The hydrolyzable silane and titanate ester treating agents must both be present in an effective viscosity reducing amount. The total weight of the hydrolyzable silane and titanate together will typically represent at least 0.1% of the total weight of pigment in order to provide effective viscosity reduction. Generally the total weight of silane and titanate together is useful within a range of about 0.1 to about 7% by weight based upon the total weight of all the pigment. It is generally preferred to utilize the silane and titanate in substantially equal amounts although useful combinations can be achieved using a silane level from about 1 to about 99% of the total weight of silane and titanate.

The silane and titanate treating agents can be added directly to the pigments to be treated, typically in a solvent such as water, alcohol, esters, ketones, etc. or, preferably they are incorporated into the high solids coating formulation by mixing the silane and titanate with the liquid coating composition either before or after the dispersion of the pigment within the vehicle. The order of addition of the silane and titanate does not appear to be critical and either may be added first or they may both be added simultaneously as a blend.

The hydrolyzable silanes useful in the practice of this invention are well known in the art and are commercially available. They are frequently referred to as coupling agents. The hydrolyzable silanes typically useful in the practice of this invention are characterized by the generic formula $$R_a(SiX_{4-a})_b$$

wherein R is an organic radical whose free valence is equal to the value of b and can be an alkyl group of 1 to about 18 carbon atoms, preferably 1 to about 8 carbon atoms, or an organofunctional group of 2 to about 10 carbon atoms bonded to silicon by a carbon to silicon bond; a is equal to 0, 1 or 2; and X is a hydrolyzable group. Typical hydrolyzable groups include alkoxy of 1 to about 4 carbon atoms, alkoxyalkoxy containing up to about 6 carbon atoms, halogen such as chlorine, fluorine, or bromine, acyloxy of 2 to about 4 carbon atoms, phenoxy, and oxime. The preferred hydrolyzable groups are alkoxyalkoxy, acyloxy and especially alkoxy. Representative organofunctional groups which can be represented by R include vinyl, methacryloxy, amino, glycidyl, mercapto, polysulfide, ureido, polyazamide, etc.

Representative examples of useful silanes include:
CH$_3$Si(OCH$_3$)$_3$
CH$_3$CH$_2$Si(OCH$_2$CH$_3$)$_3$
CH$_3$(CH$_2$)$_4$Si[OCH(CH$_3$)$_2$]$_3$
CH$_3$CH$_2$O(CH$_2$CH$_2$O)$_{32}$Si(OCH$_3$)$_3$
CH$_2$=CHSi(O$_2$CCH$_3$)$_3$
NCCH$_2$CH$_2$Si(OCH$_2$CH$_3$)$_3$
H$_2$NCH$_2$CH$_2$NH(CH$_2$)$_3$Si(OCH$_3$)$_3$
CH$_2$=CHCH$_2$Si(OCH$_2$CH$_2$OCH$_3$)$_3$ etc.

Other commerically available hydrolyzable silanes include N-(2-aminoethyl)-3-amino-propyltrimethoxy silane, 3-methacryloxypropyl trimethoxysilane, 3[2(vinyl benzylamino) ethylamino]propyltrimethoxy silane, 3-glycidoxy propyltrimethoxy silane, tris (2-methyoxyethoxy) vinylsilane, and 3-chloropropyltrimethoxy silane. Other representative silanes are taught in U.S. Pat. Nos. 2,846,458 and 3,746,348 the teaching of which is hereby incorporated by reference.

Especially preferred silanes are those wherein R is lower alkyl of 1-3 carbons and X is a lower alkyl alkoxy. Especially preferred is methyl triethoxy silane.

Numerous titanate esters useful in treating pigments are also known in the art and commercially available. They are frequently referred to as coupling agents and they become associated with the surface of the pigment either by physical adsorption or by covalent bonding, e.g. through transesterification. Titanate coupling agents are representatively taught in U.S. Pat. Nos. 2,984,641, 4,069,192, 4,080,353, 4,087,402, 4,094,853, 4,098,758, 4,122,062 and 4,450,221, the teachings of which are hereby incorporated by reference.

Any titanate ester coupling agent can be used in the practice of this invention. Representative useful titanate esters have the following formula:

$$R'_nTi(X)_{4-n}$$

wherein X is —OR, —OCOR, or OAr wherein R is an aliphatic or aralkyl group of 1 to about 50 carbons or substituted derivatives thereof; OAr is aroxy; n is 0, 1, 2 or 3 and R' is an organic or inorganic moiety bonded to the Ti and can be thioaroxy, sulfonyl, sulfinyl, diester pyrophosphate, diester phosphate or a substituted derivative thereof. In addition to these covalent substituents the titanate can also have associated therewith chelating or complexing agents e.g. dioxo compounds such as acetoacetone, 3-methylacetoacetone, 3-ethylacetoacetone, 3-5 heptadione etc., or $$\begin{array}{c} OH \\ | \\ P-(OR'')_2 \end{array}$$

wherein R" represents an aliphatic group of 1 to about 50 carbons or substituted derivatives thereof. The substituted derivatives of any of these groups may contain heteroatoms such as N, O, S, P, etc.

Representative useful titanate esters commercially available from Kenrich Petrochemicals, Inc. include:

| TITANATE COUPLING AGENT | DESCRIPTION |
|---|---|
| KR-TTS | isopropyl, triisostearoyl titanate |
| KR-201 | diisostearoyl, ethylene titanate |
| KR-33BS | isopropyl trimethacryl titanate |
| KR-133BS | titanium dimethacrylate, oxyacetate |
| KR-39BS | isopropyl, triacryl titanate |
| KR-139BS | titanium diacrylate, oxyacetate |
| KR-34S & BS | isopropyl tricumylphenyl titanate |
| KR-134S & BS | titanium di(cumylphenolate) oxyacetate |
| KR-44 | isopropyl, tri(N ethylamino-ethylamino) titanate |
| KR-52S | isopropyl, tri(2-aminobenzoyl) titanate |
| KR-63S | isopropyl, tri(tetraethylenetriamine) titanate |
| KR-66S | isopropyl, tri(3-mecaptopropionyl) titanate |
| KR-27S | isopropyl triricinoyl titanate |
| KR-9S | isopropyl, tridodecylbenzenesulfonyl titanate |
| KR-12 | isopropyl, tri(dioctylphosphato) titanate |
| KR-112S | titanium di(dioctylphosphate) oxyacetate |
| KR-212 | di(dioctylphosphato) ethylene titanate |
| KR-38S | isopropyl tri(dioctylpyrophosphato) titanate |
| KR-138S | titanium di(dioctylpyrophosphate) oxyacetate |
| KR-238S | di(dioctylpyrophosphato) ethylene titanate |
| KR-58FS | tri(butyl, octyl pyrophosphato) isopropyl titanate |
| KR-158FS | titanium di(butyl, octyl pyrophosphate) de (dioctyl, hydrogen phosphite)oxyacetate |
| KR-62ES | di(butyl, methyl pyrophosphato), isopropyl titanate mono(dioctyl, hydrogen) phosphite |
| KR-262ES | di(butyl, methyl pyrophosphato) ethylene titanate mono(dioctyl, hydrogen phosphate) |
| KR-36C | tetraisopropyl di(tridecylphosphito) titanate |
| KR-41B | tetraisopropyl, di(dioctylphosphito) |

-continued

| TITANATE COUPLING AGENT | DESCRIPTION |
|---|---|
| | titanate |
| KR-46B | tetraoctyloxytitanium di(ditridecylphosphite) |
| KR-55 | titanium di(di-tridecyl) phosphite |

Especially preferred in the practice of this invention is tetra (2,2-diallyoxymethyl-1-butoxy) titanium di (di-tridecyl) phosphite.

As shown in the Tables, the silane/titanate blend almost invariably provides a much lower initial viscosity than either one alone and therefore provides a more gradual reduction of viscosity on aging. This characteristic is especially useful to provide low viscosities during the manufacture of the coating and to provide better viscosity control upon aging. Although it is not our intent to be bound by theory, it is believed that the low initial viscosity provided by the blend of silane and titanate may result from the presence of the titanate which, in addition to reacting with or becoming adsorbed upon the pigment surface, also catalyzes the reaction of the silane with the pigment surface thereby providing more complete and faster initial treatments of the pigments.

The following examples are intended to illustrate the invention but are not presented as limitations upon the scope of the claims. In each of the tables, unless otherwise indicated, the numeric amounts of each of the raw materials is in parts by weight, and the Brookfield Viscosity was measured using a number 5 spindle and the viscosity readings are expressed in centipoise. The initial viscosity measurements were taken after two days. Samples were shaken for four minutes before checking the viscosities.

In each of the formulation examples the titanate was tetra (2,2 diallyloxymethyl-1 butoxy) titanium di (di-tridecyl phosphite), marketed as TTMDTP-55 by Kenrich Petrochemicals and the silane was methyltriethoxy silane, marketed by Dow Corning. The formulations are set at approximately 60% PVC as described in the Tables. In actual use as coatings formulations, each of the resins described in the Tables require the addition of a crosslinker such as a melamine or urea, a polyisocyanate or a polyamine which would reduce the formulations to a PVC of about 30–40% actually applied.

Each of the paint formulations shown in Tables I through V, except for Example 17 were manufactured on a high speed disperser using a Cowles impeller according to the following recipe:

| Resin | | |
|---|---|---|
| Cyclohexanone | Disperse | Step 1 |
| Silane | | |
| Titanate | | |
| Pigments | Add | Step 2 |
| Grind | 15 Minutes | |
| Methylethyl Ketone | Let Down | Step 3 |

Example 17 was manufactured as shown above except that the silane and titanate were held out of the manufccturing process and were added after the paint formulation had been manufactured.

The coating formulations described in Table I show the significant reduction in viscosity of the coating formulations for all levels of the titanate and silane coupling agents. The initial viscosities at both the 10 RPM and 100 RPM shear rates and the viscosity of the samples after aging 30 days and the thixotropy ratio were significantly decreased whenever the titanate and silane materials were present.

TABLE I

EFFECT OF COMBINATION OF SILANE AND TITANATE ADDITIVES AT VARIOUS LEVELS ON VISCOSITY

| EXAMPLE | (1) RESIN | TiO2 | TALC | BARYTES | TITANATE | SILANE | CYCLOHEXANONE | METHYL ETHYL KETONE | INITIAL 10 RPM CPS | AFTER 30 DAYS | 100 RPM CPS | AFTER 30 DAYS | THIXO RATIO INITIAL | AFTER 30 DAYS |
|---|---|---|---|---|---|---|---|---|---|---|---|---|---|---|
| 1 | 200 | 200 | 200 | 200 | — | — | 125 | 125 | 8560 | 7960 | 1364 | 1232 | 6.275 | 6.465 |
| 2 | 200 | 200 | 200 | 200 | 3.0 | 3.0 | 119 | 125 | 5560 | 2920 | 896 | 520 | 6.205 | 5.615 |
| 3 | 200 | 200 | 200 | 200 | 4.5 | 4.5 | 116 | 125 | 5320 | 2920 | 896 | 544 | 5.938 | 5.330 |
| 4 | 200 | 200 | 200 | 200 | 6.0 | 6.0 | 113 | 125 | 4360 | 2400 | 744 | 460 | 5.86 | 5.217 |
| 5 | 200 | 200 | 200 | 200 | 7.5 | 7.5 | 110 | 125 | 3960 | 2080 | 668 | 416 | 5.928 | 5.00 |
| 6 | 200 | 200 | 200 | 200 | 9.0 | 9.0 | 107 | 125 | 3640 | 1920 | 648 | 376 | 5.617 | 5.10 |
| 7 | 200 | 200 | 200 | 200 | 10.5 | 10.5 | 104 | 125 | 2720 | 1600 | 496 | 344 | 5.48 | 4.65 |
| 8 | 200 | 200 | 200 | 200 | 12.0 | 12.0 | 101 | 125 | 2720 | 1960 | 512 | 408 | 5.312 | 4.80 |

(1)Desmophen ® 651-A-65 (65% solids hydroxy functional polyester marketed by Mobay Chemical Co.)

The coating examples shown in Table II clearly indicate that the titanate alone at any of the levels tested fails to provide as low a viscosity as that provided by the combination of titanate and silane shown in Example 17.

TABLE II

EFFECT OF TITANATE ADDITIVE ONLY AT VARIOUS LEVELS ON VISCOSITY

| EXAMPLE | (1) RESIN | TiO2 | TALC | BARYTES | TITANATE | SILANE | CYCLOHEXANONE | METHYL ETHYL KETONE | INITIAL 10 RPM CPS | AFTER 30 DAYS | 100 RPM CPS | AFTER 30 DAYS | THIXO RATIO INITIAL | AFTER 30 DAYS |
|---|---|---|---|---|---|---|---|---|---|---|---|---|---|---|
| 9 | 200 | 200 | 200 | 200 | 3 | — | 122 | 125 | 7200 | 5720 | 1093 | 904 | 6.593 | 6.327 |
| 10 | 200 | 200 | 200 | 200 | 6 | — | 119 | 125 | 7280 | 5920 | 1160 | 956 | 6.276 | 6.192 |
| 11 | 200 | 200 | 200 | 200 | 9 | — | 116 | 125 | 7120 | 5840 | 1112 | 960 | 6.403 | 6.083 |
| 12 | 200 | 200 | 200 | 200 | 12 | — | 113 | 125 | 6840 | 5760 | 1100 | 948 | 6.218 | 6.075 |
| 13 | 200 | 200 | 200 | 200 | 15 | — | 110 | 125 | 6160 | 5720 | 980 | 880 | 6.285 | 6.5 |

TABLE II-continued
EFFECT OF TITANATE ADDITIVE ONLY AT VARIOUS LEVELS ON VISCOSITY

| EXAMPLE | RESIN(1) | TiO₂ | TALC | BARYTES | TITANATE | SILANE | CYCLOHEXANONE | METHYL ETHYL KETONE | INITIAL 10 RPM CPS | AFTER 30 DAYS | 100 RPM CPS | AFTER 30 DAYS | THIXO RATIO INITIAL | AFTER 30 DAYS |
|---|---|---|---|---|---|---|---|---|---|---|---|---|---|---|
| 14 | 200 | 200 | 200 | 200 | 18 | — | 107 | 125 | 6080 | 4320 | 972 | 748 | 6.255 | 5.775 |
| 15 | 200 | 200 | 200 | 200 | 21 | — | 104 | 125 | 6400 | 3200 | 1004 | 588 | 6.375 | 5.442 |
| 16 | 200 | 200 | 200 | 200 | 24 | — | 101 | 125 | 6160 | 2280 | 1032 | 436 | 5.696 | 5.229 |
| 17 | 200 | 200 | 200 | 200 | 6 | 6 | 110 | 125 | 4120 | 1760 | 660 | 384 | 6.242 | 4.583 |

(1)Desmophen ® 651-A-65 (65% solids hydroxy functional polyester marketed by Mobay Chemical Co.)

The coating formulations described in Table III indicate that the use of silane alone does not provide as low an initial viscosity as the combination of titanate and silane shown in Example 17. Additionally, Example 21 which shows a weight of silane equivalent to the combined weights of silane and titanate in Example 17 shows a consistently higher viscosity both initially and after 30 days at both shear rates measured.

TABLE III
EFFECT OF SILANE ADDITIVE ONLY AT VARIOUS LEVELS ON VISCOSITY

| EXAMPLE | RESIN(1) | TiO₂ | TALC | BARYTES | TITANATE | SILANE | CYCLOHEXANONE | METHYL ETHYL KETONE | INITIAL 10 RPM CPS | AFTER 30 DAYS | 100 RPM CPS | AFTER 30 DAYS | THIXO RATIO INITIAL | AFTER 30 DAYS |
|---|---|---|---|---|---|---|---|---|---|---|---|---|---|---|
| 18 | 200 | 200 | 200 | 200 | — | 3 | 122 | 125 | 9840 | 5000 | 1456 | 852 | 6.758 | 5.87 |
| 19 | 200 | 200 | 200 | 200 | — | 6 | 119 | 125 | 10360 | 5000 | 1508 | 824 | 6.870 | 6.068 |
| 20 | 200 | 200 | 200 | 200 | — | 9 | 116 | 125 | 9240 | 5000 | 1340 | 828 | 6.840 | 6.03 |
| 21 | 200 | 200 | 200 | 200 | — | 12 | 113 | 125 | 9760 | 6400 | 1424 | 1064 | 6.840 | 6.01 |
| 22 | 200 | 200 | 200 | 200 | — | 15 | 110 | 125 | 6320 | 1080 | 952 | 244 | 6.638 | 4.42 |
| 23 | 200 | 200 | 200 | 200 | — | 18 | 107 | 125 | 6000 | 760 | 912 | 212 | 6.579 | 3.584 |
| 24 | 200 | 200 | 200 | 200 | — | 21 | 104 | 125 | 7880 | 760 | 1152 | 212 | 6.84 | 3.584 |
| 25 | 200 | 200 | 200 | 200 | — | 24 | 101 | 125 | 8680 | 800 | 1356 | 224 | 6.4 | 3.572 |

(1)Desmophen ® 651-A-65 (65% solids hydroxy functional polyester marketed by Mobay Chemical Co.)

The coating formulations described in Table IV indicate that the use of the combination of the titanate and silane is also effective for other representative resin systems such as epoxies or acrylics. For each system the viscosity is significantly reduced by the combination of the titanate and the silane.

TABLE IV
EFFECT OF SILANE AND TITANATE ADDITIVES IN PRESENCE OF DIFFERENT POLYMER SYSTEMS

| EXAMPLE | RESIN | TiO₂ | TALC | BARYTES | TITANATE | SILANE | CYCLOHEXANONE | METHYL ETHYL KETONE | INITIAL 10 RPM CPS | AFTER 30 DAYS | 100 RPM CPS | AFTER 30 DAYS | THIXO RATIO INITIAL | AFTER 30 DAYS |
|---|---|---|---|---|---|---|---|---|---|---|---|---|---|---|
| 26 | 173.33(2) | 200 | 200 | 200 | 6 | 6 | 122 | 125 | 1600 | 360 | 344 | 144 | 4.65 | 2.5 |
| 27 | 173.33(2) | 200 | 200 | 200 | — | — | 134 | 125 | 23200 | 23000 | 3240 | 3200 | 7.16 | 7.19 |
| 28 | 216.73(3) | 200 | 200 | 200 | 6 | 6 | 122 | 125 | 1520 | 600 | 352 | 216 | 4.34 | 2.78 |
| 29 | 216.73(3) | 200 | 200 | 200 | — | — | 134 | 125 | 2074 | 2160 | 540 | 456 | 5.0 | 4.74 |

(2)Epoxy Resin GZ7071-C-75 (75% solids Bisphenol A/Epichlorohydrin epoxy manufactured by Ciba-Giegy)
(3)G-Cure 867 Acrylic (60% solids hydroxy functional high solid acrylic resin manufactured by Henkel)

The coating formulations in Table V provide a constant PVC comparison of a number of pigments while the titanate and silane levels are maintained at 1% of the total pigment weight. Again, in each case, the combination of the titanate and silane materials significantly reduces the viscosity of the high solids coating formulation in combination with any extender pigment or with titanium dioxide.

TABLE V
EFFECT OF SILANE AND TITANATE ADDITIVES ON VARIOUS PIGMENTS

| EXAMPLE | RESIN(1) | TiO₂ | EXTENDER | TITANATE | SILANE | CYCLOHEXANONE | METHYL ETHYL KETONE | INITIAL 10 RPM CPS | AFTER 30 DAYS | 100 RPM CPS | AFTER 30 DAYS | THIXO RATIO INITIAL | AFTER 30 DAYS |
|---|---|---|---|---|---|---|---|---|---|---|---|---|---|
| 30 | 200 | 600 | — | — | — | 100 | 100 | 560 | 480 | 312 | 220 | 1.795 | 2.18 |
| 31 | 200 | 600 | — | 6 | 6 | 100 | 88 | 4680 | 600 | 1068 | 396 | 4.382 | 1.515 |
| 32 | 200 | — | 460(5) | — | — | 125 | 100 | 2040 | 1520 | 852 | 700 | 2.394 | 2.171 |
| 33 | 200 | — | 460(5) | 4.6 | 4.6 | 125 | 100 | 1720 | 1000 | 628 | 484 | 2.739 | 2.06 |
| 34 | 250 | — | 166(6) | — | — | 250 | 100 | 600 | 520 | 184 | 174 | 3.260 | 3.02 |

TABLE V-continued
EFFECT OF SILANE AND TITANATE ADDITIVES ON VARIOUS PIGMENTS

| EXAMPLE | (1) RESIN | TiO$_2$ | EXTENDER | TITANATE | SILANE | CYCLOHEXANONE | METHYL ETHYL KETONE | BROOKFIELD VISCOSITY ||||||
|---|---|---|---|---|---|---|---|---|---|---|---|---|---|
| | | | | | | | | INITIAL 10 RPM CPS | AFTER 30 DAYS | 100 RPM CPS | AFTER 30 DAYS | THIXO RATIO INITIAL | AFTER 30 DAYS |
| 35 | 250 | — | 166[6] | 1.7 | 1.7 | 250 | 100 | 280 | 160 | 108 | 108 | 2.592 | 1.481 |
| 36 | 200 | — | 550[7] | — | — | 123 | 50 | 1160 | 1080 | 768 | 752 | 1.510 | 1.436 |
| 37 | 200 | — | 550[7] | 5.5 | 5.5 | 112 | 50 | 1000 | 520 | 628 | 488 | 1.592 | 1.066 |
| 38 | 200 | — | 724[8] | — | — | 100 | 50 | 760 | 880 | 456 | 420 | 1.667 | 2.095 |
| 39 | 200 | — | 724[8] | 7.2 | 7.2 | 85 | 50 | 1640 | 1200 | 640 | 552 | 2.563 | 2.174 |

[1]Desmophen ® 651-A-65 (65% solids hydroxy functional polyester marketed by Mobay Chemical Co.)
[5]TALC
[6]BARYTES
[7]10 MICRON A-10 SILICA
[8]SYLOID ® 74X SILICA The formulations described in Tables I through V maintain their reduced viscosity characteristics after they are combined with their appropriate crosslinking agents.

While this invention has been described by a number of specific embodiments, it is obvious that other variations and modifications may be made without departing from the spirit and scope of the invention as set forth in the appended claims.

The invention claimed is:

1. A process for reducing the viscosity of a high solid coating composition which process comprises incorporating into the high solid coating composition an effective viscosity reducing amount of at least one hydrolyzable silane and an effective viscosity reducing amount of at least one titanate ester, wherein the high solid coating composition has a pigment volume concentration of at least 20% and comprises an inert, volatile solvent component and non-volatile component, wherein the non-volatile component consists essentially of:
 (a) an organic film-forming vehicle having active hydrogen or epoxy functionality;
 (b) a crosslinker for the film-forming vehicle; and
 (c) at least one extender pigment.

2. The process of claim 1 further characterized in that the hydrolyzable silane is methyltriethoxy silane.

3. The process of claim 1 further characterized in that the titanate ester is tetra (2,2 diallyloxymethyl-1 butoxy) titanium di (di-tridecyl) phosphite.

4. The process of claim 1 further characterized in that silane and titanate together are incorporated in the high solid coating composition in a range of 0.1 to about 7.0% by weight based upon the total weight of extender pigment.

5. The process of claim 4 further characterized in that the silane is present at a level to provide from 1 to 99% of the total weight of silane and titanate.

6. A process for reducing the viscosity of a high solid coating composition which process comprises incorporating into the high solid coating composition an effective viscosity reducing amount of at least one hydrolyzable silane and an effective viscosity reducing amount of at least one titanate ester, wherein the high solid coating composition has a pigment volume concentration of at least 20% and comprises an inert, volatile solvent component and a non-volatile component, wherein the non-volatile component consists essentially of:
 (a) an organic film-forming vehicle having active hydrogen or epoxy functionality;
 (b) a crosslinker for the film-forming vehicle;
 (c) at least one extender pigment; and
 (d) at least one opacifying pigment.

7. The process of claim 6 further characterized in that the opacifying pigment is titanium dioxide.

8. The process of claim 6 further characterized in that the hydrolyzable silane is methyltriethoxy silane.

9. The process of claim 6 further characterized in that the titanate ester is tetra(2,2 diallyloxymethyl-1 butoxy) titanium di (di-tridecyl) phosphite.

10. The process of claim 6 further characterized in that silane and titanate together are incorporated the high solid coating composition in a range of 0.1 to about 7.0% by weight based upon the total weight of opacifying and extender pigment.

11. The process of claim 10 further characterized in that the silane is present at a level to provide from 1 to 99% of the total weight of silane and titanate.

* * * * *